US005376157A

United States Patent [19]

Yam et al.

[11] Patent Number: 5,376,157

[45] Date of Patent: Dec. 27, 1994

[54] LESS AGGRESSIVE BLAST MEDIA FORMED FROM COMPACTED PARTICLES

[75] Inventors: Benny S. Yam, Holmdel; Amy L. Joseph, Hopewell, both of N.J.; Keith A. Jones, Yardley, Pa.

[73] Assignee: Church & Dwight Co., Inc., Princeton, N.J.

[21] Appl. No.: 193,763

[22] Filed: Feb. 3, 1994

Related U.S. Application Data

[62] Division of Ser. No. 6,654, Jan. 21, 1993, Pat. No. 5,308,404.

[51] Int. Cl.[5] .............................................. C09C 1/68

[52] U.S. Cl. .................................... 51/307; 51/309; 252/128; 252/131; 252/174.14

[58] Field of Search ..................... 51/307, 309; 106/3; 252/38, 128, 131, 160, 174.14

[56] References Cited

U.S. PATENT DOCUMENTS

| | | | |
|---|---|---|---|
| 4,035,257 | 7/1977 | Cherney | 252/160 |
| 4,244,989 | 1/1981 | Noomen | 427/180 |
| 4,751,016 | 6/1988 | Tse et al. | 51/309 |
| 4,786,432 | 11/1988 | Kanfer et al. | 252/128 |
| 5,112,406 | 5/1992 | Lajoie et al. | 134/7 |
| 5,160,547 | 11/1992 | Kirschner et al. | 134/7 |

*Primary Examiner*—Mark L. Bell
*Assistant Examiner*—Deborah Jones
*Attorney, Agent, or Firm*—Charles B. Barris

[57] ABSTRACT

A blast media for stripping contaminants from very soft and sensitive substrates comprises compacted abrasive particles which are formed by compacting very fine particles of the abrasive into larger particles which are friable and which will break apart into fine particles upon contacting the substrate surface.

7 Claims, No Drawings

LESS AGGRESSIVE BLAST MEDIA FORMED FROM COMPACTED PARTICLES

This application is a division of application Ser. No. 08/006,654, filed Jan. 21, 1993 now U.S. Pat. No. 5,308,404.

FIELD OF THE INVENTION

The present invention relates to improvements in blast media utilized to remove adherent material such as paint, scale, dirt, grease and the like from solid surfaces. In particular, the present invention is directed to an abrasive blast media which can be used to blast clean soft solid substrates.

DESCRIPTION OF THE PRIOR ART

In order to clean a solid surface so that such surface can again be coated such as, for example, to preserve metal against deterioration, remove graffiti from stone or simply to degrease or remove dirt from a solid surface, it has become common practice to use an abrasive blasting technique wherein abrasive particles are propelled by a high pressure fluid against the solid surface in order to dislodge previously applied coatings, scale, dirt, grease or other contaminates. Various abrasive blasting techniques have been utilized to remove coatings, grease and the like from solid surfaces. Thus, blasting techniques comprising dry blasting which involves directing the abrasive particles to a surface by means of pressurized air typically ranging from 30 to 150 psi, wet blasting in which the abrasive blast media is directed to the surface by a highly pressurized stream of water typically 3,000 psi and above, multi-step processes comprising dry or wet blasting and a mechanical technique such as sanding, chipping, etc. and a single step process in which both air and water are utilized either in combination at high pressures to propel the abrasive blast media to the surface as disclosed in U.S. Pat. No. 4,817,342, or in combination with relatively low pressure water used as a dust control agent or to control substrate damage have been used. Water for dust control has been mixed with the air either internally in the blast nozzle or at the targeted surface to be cleaned and such latter process, although primarily a dry blasting technique, is considered wet blasting inasmuch as media recovery and clean up is substantially different from that utilized in a purely dry blasting operation.

The blast media or abrasive particles most widely used for blasting surfaces to remove adherent material therefrom is sand. Sand is a hard abrasive which is very useful in removing adherent materials such as paint, scale and other materials from metal surfaces such as steel. While sand is a most useful abrasive for each type of blasting technique, there are disadvantages in using sand as a blast media. For one, sand, i.e., silica, is friable and upon hitting a metal surface will break into minute particles which are small enough to enter the lungs. These minute silica particles pose a substantial health hazard. Additionally, much effort is needed to remove the sand from the surrounding area after completion of blasting. Still another disadvantage is the hardness of sand itself. Thus, sand cannot readily be used as an abrasive to remove coatings from relatively soft metals such as aluminum or any other soft substrate such as plastic, plastic composite structures, concrete or wood, as such relatively soft substrates can be excessively damaged by the abrasiveness of sand. Moreover, sand cannot be used around moving parts of machinery inasmuch as the sand particles can enter bearing surfaces and the like.

An alternative to sand as a blast media, particularly, for removing adherent coatings from relatively soft substrates such as softer metals as aluminum, composite surfaces, plastics, ceramic tile, concrete and the like is sodium bicarbonate. While sodium bicarbonate is softer than sand, it is sufficiently hard to remove coatings from aluminum surfaces and as well remove other coatings including paint, dirt, and grease from non-metallic surfaces without harming the substrate surface. Sodium bicarbonate is not harmful to the environment and is most advantageously water soluble such that the particles which remain subsequent to blasting can be simply washed away without yielding environmental harm. Since sodium bicarbonate is water soluble and is benign to the environment, this particular blast media has found increasing use in removing coatings and cleaning dirt, grease and oil and the like from hard surfaces such as steel and interior surfaces such as those which contact food such as in environments of food processing or handling.

Sodium bicarbonate is also a friable abrasive and, like sand, will form a considerable amount of dust during the blast cleaning process. To control the dust formed by the sodium bicarbonate blast media as it contacts the targeted surface, water is included in the pressurized fluid carrier medium. Thus, water can be used as the carrier fluid or, more preferably, injected into a pressurized air stream which carries the blast media from the blast nozzle to the targeted surface. Water as a means to control dust has been mixed with the air stream internally in the blast nozzle or into the air stream externally of the nozzle. The addition of water to the pressurized air stream has been very effective in controlling dust formed by the sodium bicarbonate blast media.

The sodium bicarbonate blast media which has been utilized to remove coatings, dirt, grease, etc. from relatively soft substrates is generally used in the form of particles having a size range of from about 10 to 1,000 microns in diameter. Sodium bicarbonate abrasive particles having a size range of from about 100 to 300 microns have been most widely used as a blast media. While the use of this softer blast media has been found advantageous for stripping contaminants from a variety of relatively soft substrates, an abrasive blast media having a size of at least 50 microns still may under certain instances yield too severe of an abrasive action on the substrate surface. For example, very soft substrates as soft plastic materials, softer woods, optical materials such as glass and plastic, and electronic components such as semiconductor wafers as well as sensitive chemical equipment required to be extremely clean to operate effectively may be sensitive to abrasives. While chemical treatment such as by the application of solvents on such surfaces has been utilized, solvents are more expensive than blast media generally, can harm the treated surface and may pose environmental problems as certain chemical solvents are hazardous to human health or generally degrade the environment. Abrasive blast techniques have been attempted to clean very soft or sensitive substrates. For example, blast media which are formed cryogenically such as dry ice particles have been utilized to clean semiconductive wafers and chemical vapor deposition (CVD) equipment. The cryogenic equipment needed to form such blast media is expensive and cumbersome and accordingly the blast cleaning process with cryogenically formed blast media is not very cost effective.

A blast media such as sodium bicarbonate which has a Mohs hardness of about 3 which is sufficiently hard to strip contaminants from a surface would be very useful for these softer and sensitive substrates if the abrasive particles could be reduced in size. Thus, very fine particulate sodium bicarbonate such as particles under 100 microns in diameter would be most useful as an abrasive to strip contaminants from these soft and sensitive substrates. Unfortunately, the free flow of sodium bicarbonate particles having such a small size is adversely affected and, accordingly, such very fine particulate sodium bicarbonate cannot readily be used to blast clean with conventional blasting equipment. Blasting equipment typically used to direct sodium bicarbonate particles to a targeted substrate comprises a blast nozzle containing juxtaposed converging inlet and diverging outlet structure and a venturi orifice placed therebetween to accelerate the particles to a high velocity. Flow through such type of nozzle is drastically inhibited if an abrasive medium having very small particle sizes is used. Thus, not only sodium bicarbonate blast media but, in general, abrasive particles having a Mohs hardness of less than 5 could be advantageously used to strip contaminants from very soft substrates if the blast media could be configured in a size range which is not too massive to degrade soft and sensitive substrates and, at the same time, not too small that free flow through conventional blasting equipment and toward a targeted surface is hindered.

Accordingly, it is a primary objective of the present invention to provide a non-volatile abrasive blast media which can strip contaminants from very soft and sensitive substrates and be capable of being directed to the substrate by conventional blasting equipment.

Another object of the present invention is to provide a method of blast cleaning very soft and sensitive substrates with a soft abrasive media by means of conventional blasting equipment.

Still another object of the present invention is to provide a method of forming abrasive particles which are less aggressive, i.e., Mohs hardness of 5.0 or less, which can be used to remove contaminants from very soft and sensitive substrates without damaging the same and still remain free flowing through conventional blasting equipment.

SUMMARY OF THE INVENTION

In accordance with the present invention, a less aggressive abrasive blast media is formed from abrasives having a Mohs hardness of about 5.0 or less for use in stripping contaminants from very soft and sensitive substrates by compacting very fine particles of the abrasives to form larger particles which are free flowing through conventional blasting equipment but which upon contacting the targeted surface will break into the very fine particle raw material and not harm the substrate.

DETAILED DESCRIPTION OF THE INVENTION

The blast media to be utilized include a powdery abrasive which has a Mohs hardness of less than about 5.0 and which can be formed into particles having an average particle size of from submicron to less than 100 microns in diameter. Larger particles up to about 200 microns may be used as starting materials since the large particles are likely to be crushed into small particles during the compaction process. Water soluble blast media are preferred and advantageous since such blast media can be readily disposed of by a water stream, are readily separated from the insoluble paints and resins which have been stripped to facilitate waste disposal, and since most water soluble blast media are relatively soft and have a Mohs hardness of less than 5.0. Non-limiting examples of water soluble blast media which can be utilized include the alkali metal and alkaline earth metal salts such the chlorides, chlorates, carbonates, bicarbonates, sulfates, silicates, the hydrates of the above, etc. The preferred blast media are the alkali metal salts and, in particular, the sodium and potassium carbonates, bicarbonates, silicates and sulfates. The most preferred blast media are the alkali metal bicarbonates as exemplified by sodium bicarbonate. Also preferably useful are sodium sesquicarbonate, natural sodium sesquicarbonate known as trona, sodium bicarbonate, sodium carbonate, potassium carbonate, potassium bicarbonate, sodium chloride and sodium sulfate which is described in commonly assigned U.S. Pat. No. 5,112,406. It is important to note that by water soluble is not meant completely water soluble as some salts and natural minerals such as trona may contain minor amounts of insoluble materials. For example, trona which is a natural sodium sesquicarbonate may contain up to 10 wt. % of insolubles. Thus, by water soluble is meant to include those materials which are substantially soluble in water.

Although the use of water soluble abrasive blast media is preferred, any type of abrasive media can be utilized. Thus, any abrasive blast particle which can be provided in a very fine particulate size and then compacted to yield a friable granule having a particle size of at least 50 microns and a Mohs hardness of no greater than about 5.0 can be used to strip contaminants from soft and sensitive substrates. Non-limiting examples of known softer abrasives which have been used as blast media include plastics, corn cobs, rice hulls, walnut shells and the like. Alkaline earth metal salts such as calcium carbonate, magnesium carbonate, calcium sulfate, etc. may also be useful.

Abrasive blast media which are in the form of particles having a very fine particle size less than 100 microns and having a Mohs hardness of from about 2.0 to no greater than about 5.0 are capable of stripping contaminants from soft substrates and sensitive surfaces without harming such surface. Unfortunately, as discussed above, most blast media when provided in the form of particles having such a very small particle size are not readily free flowing. Such very fine media will typically have the consistency of flour. Thus, while the fine particle size is useful in that very fine abrasive particles can strip contaminants from surfaces without harming soft and sensitive surfaces, the material simply cannot be readily used with conventional blasting equipment. In accordance with the present invention, these very fine abrasive particles are compacted by means of pressure only to form larger abrasive particles of the blast media which are friable and upon contact with each other and with the targeted surface will be broken into fine particles which will clean, but not degrade the surface of the substrate being targeted.

Compacting may be performed by applying pressure to the very finely divided unagglomerated abrasive particles. It may be performed by continuously admitting the blended raw particles to a zone wherein the particles are subjected to pressure between two rolls running oppositely with respect to each other. A preferred means of compacting is by a roller compactor, wherein the particles are subjected to pressure between two rolls under an adjustable compacting pressure. An especially preferred compactor is the Fitzpatrick Company "CHILSONATER" roll compactor. The gap between the rolls, the amount of raw material introduced to such a roll compactor and the compacting pressure can be adjusted to produce cohesive sheets or pellets of desired densities and hardness.

Granulating can be performed by any suitable granulating or crushing means. The resulting compacted sheets, pellets, or sticks may be crushed to a desired weighted average particle diameter range of 50–1,000 microns. Preferably, the compacted sheets, pellets or sticks are fed through a sieve crusher to force the compacted materials through a sieve with meshes of a given size determining the particle size of the final product. Most preferably, no more than 1% of the abrasive particles will be greater than 1,000 microns.

Screening, if desired, can be performed by any suitable screening device. For instance, the crushed material may be screened to separate oversized and undersized particles in conventional oscillating sieves. The oversized and undersized particles may be recycled into the process.

The abrasive blast media particles, now compacted and granulated into particles having a diameter of from at least about 50 microns are now free flowing and can be directed against a targeted surface by means of conventional blasting equipment and methods of blast cleaning. In general, a blast cleaning operation involves entraining the abrasive blast particles in a pressurized fluid stream such as water, air, or both and directing said stream through a blast nozzle which accelerates the particles therethrough to the targeted surface. A typical blast nozzle is exemplified by a standard round nozzle which contains a converging conical section, a venturi throat and a diverging conical surface which terminates in an outlet. The venturi effect formed by the juxtaposed conical sections and the venturi throat serves to accelerate the blast media out of the outlet to an extremely high velocity effective to clean or remove adhered coatings, scale, dirt, grease, etc. from the surface being targeted. Thus, a typical air-propelled abrasive blast system includes a blast nozzle that is connected to the outer end of a high pressure flexible supply hose which carries the abrasive blast media mixed with air from a dispensing device to the blast nozzle. A normally closed deadman control valve is mounted adjacent the blast nozzle and functions to prevent operation of the blast nozzle unless the control valve is held open by depressing a spring-loaded lever. Compressed air from a compressor is supplied to the dispensing means, typically a tank or pot, and carries the blast media to the supply hose. The blast nozzle is hand operated and can be moved relative to the targeted surface by the operator. It is important that the abrasive particles remain free flowing inasmuch as such abrasive media are dispensed from the tank or pot which holds the supply of abrasive through various metering valves and eventually through the nozzle by means of the pressurized fluid stream. Particles which are not free flowing will cake, bridge and not be dispersed uniformly throughout the pressurized fluid stream either from the dispensing device or through the nozzle. A non-uniform concentration of the blast media throughout the pressurized fluid stream yields an uneven stripping action which requires substantially more time to clean the targeted surface and can yield to damaged surfaces if stripping over certain areas of the targeted surface must be repeated to remove contaminants from minor untreated areas.

The blast media flow rates through the blast nozzle typically will range from about 0.5 to 15, desirably from about 1.0 to 10.0 lbs per minute and under air pressures from 10 to 100 psi. If water is used for dust control only, water pressures ranging from about 10 psi and above are most useful.

It is also useful in accordance with the present invention to include a flow aid or a decaking agent with the blast media. Most preferably, the flow aid is a hydrophilic silica, hydrophobic silica, hydrophobic polysiloxane or mixture thereof.

Hydrophobic silica, unlike known hydrophilic silicas, is substantially free of non-hydrogen bonded silanol group and absorbed water. One preferred hydrophobic silica which may be utilized in the blasting media hereof is Aerosil R 972, a product which is available from DeGussa AG. This material is a pure coagulated silicon dioxide aerosol, in which about 75% of the silanol groups on the surface thereof are chemically reacted with dimethyldichlorosilane, the resulting product having about 0.7 mmol of chemically combined methyl groups per 100 $m^2$ of surface area and containing about 1% carbon. Its particles vary in diameter from about 10 to 40 nanometers and have a specific surface area of about 110 $m^2$/gram. It may be prepared by flame hydrolysis of a hydrophilic silica as more fully described in Angew. Chem., 72, 744 (1960); F-pS 1,368,765; and DT-AS 1,163,784. Further details respecting such material are contained in the technical bulletin entitled "Basic Characteristics and Applications of AEROSIL", DeGussa AG, August 1986. The hydrophobic silica particles are admixed with the abrasive blasting agent in the proportion of at least about 0.1 and up to about 1.0% by weight thereof. Another hydrophobic silica is Quso, marketed by DeGussa A. G.

Hydrophobic polysiloxanes, preferably non-halogenated polysiloxanes, suitable for use in the blasting media hereof are commercially marketed by Dow Corning and General Electric.

EXAMPLE

Different types of abrasive particles were analyzed to determine their crushing strengths using an Instron 1123 Instrument manufactured by Instron Corp. The compacted particles of this invention were prepared by compacting sodium bicarbonate particles having a mean diameter of about 160 microns. The particles were fed to a "Chilsonater" 4L×10D cylindrical roll compactor manufactured by Fitzpatrick Co. Compacting pressure of 2,500 psi was used to form corrugated sheets of the sodium bicarbonate particles. The sheets were granulated in a Fitzmill granulator and the granules screened in a Kason screener fitted with 35 mesh and 60 mesh screens. Undersized and oversized particles were recycled to the compactor. Particles having a mean diameter of 320 microns were tested. Eight to ten individual particles of each type were analyzed and the average crush force is summarized as follows:

| Blast Media | Mean Crush Force (lbs) | Mean Particle Size (Micron |
|---|---|---|
| Sodium Bicarbonate | 0.20 | 300 |
| Sodium Bicarbonate | 0.19 | 170 |
| Compacted Sodium Bicarbonate | 0.15 | 320 |
| Trona | 0.44 | 400 |
| Sand | 2.00 | 285 |

As can be seen, the compacted sodium bicarbonate particles, although having a larger size than the control samples of singular sodium bicarbonate particles, were over 20% softer.

What is claimed is:

1. A blast media for removing contaminants from very soft or sensitive substrates comprising; compacted abrasive particles having an average diameter of at least 50 microns and having a Mohs hardness of from about 2.0 to 5.0, said compacted abrasive particles formed by compacting a plurality of abrasive particles into said compacted abrasive particles having said average diameter, said blast media further containing a flow aid selected from the group consisting of hydrophilic silica, hydrophobic silica, hydrophobic polysiloxanes and mixtures thereof.

2. The blast media of claim 1 wherein said abrasive particles are water soluble.

3. The blast media of claim 2 wherein said abrasive particles comprise sodium bicarbonate.

4. The blast media of claim 1 wherein said abrasive particles are substantially water insoluble.

5. The blast media of claim 4 wherein said abrasive particles comprise calcium carbonate.

6. The blast media of claim 1 wherein said compacted abrasive particles have an average diameter of from 50–1,000 microns.

7. The blast media of claim 6 wherein no greater than 1% of said blast media comprises compacted abrasive particles having a diameter of greater than 1,000 microns.

* * * * *